(12) United States Patent
Fraas et al.

(10) Patent No.: US 7,008,459 B1
(45) Date of Patent: Mar. 7, 2006

(54) PRETREATMENT PROCESS TO REMOVE OXYGEN FROM COAL EN ROUTE TO A COAL PYOLYSIS PROCESS AS A MEANS OF IMPROVING THE QUALITY OF THE HYDROCARBON LIQUID PRODUCT

(75) Inventors: Arthur P. Fraas, 1040 Scenic Dr., Knoxville, TN (US) 37919; Richard L. Furgerson, Knoxville, TN (US); Harold L. Falkenberry, Chattanooga, TN (US)

(73) Assignee: Arthur P. Fraas, Knoxville, TN (US)

( * ) Notice: Subject to any disclaimer, the term of this patent is extended or adjusted under 35 U.S.C. 154(b) by 576 days.

(21) Appl. No.: 08/835,419

(22) Filed: Apr. 9, 1997

(51) Int. Cl.
*C10B 1/00* (2006.01)
*C10B 7/10* (2006.01)
*C10B 31/00* (2006.01)

(52) U.S. Cl. .................. 48/86 R; 44/629; 202/117; 202/118; 110/219; 110/229

(58) Field of Classification Search .............. 48/77, 48/86 R, 210; 201/10
See application file for complete search history.

(56) References Cited

U.S. PATENT DOCUMENTS

| | | | |
|---|---|---|---|
| 4,397,657 A | * | 8/1983 | Selep et al. ............... 48/86 R |
| 4,548,529 A | * | 10/1985 | van der Burgt ........... 48/86 R |
| 4,722,768 A | | 2/1988 | Schirrmacher et al. |
| 4,775,392 A | * | 10/1988 | Cordier et al. ............ 48/86 R |
| 4,781,796 A | * | 11/1988 | Bridle et al. .............. 202/117 |
| 4,784,603 A | | 11/1988 | Robak, Jr. et al. |
| 4,931,171 A | * | 6/1990 | Piotter ..................... 208/409 |
| 4,955,989 A | * | 9/1990 | Mink ........................ 48/86 R |
| 5,232,466 A | * | 8/1993 | Dewitz ..................... 48/86 R |
| 5,284,187 A | * | 2/1994 | Schmit ..................... 48/86 R |
| 5,496,465 A | | 3/1996 | Fraas |
| 5,547,549 A | | 8/1996 | Fraas |
| 5,695,532 A | * | 12/1997 | Johnson et al. ........... 48/86 R |
| 5,743,924 A | * | 4/1998 | Dospoy et al. ............ 44/553 |
| 6,112,675 A | * | 9/2000 | Potter et al. .............. 110/229 |

OTHER PUBLICATIONS

Falkenberry et al., "Coal Pyrolysis—A DOE Perspective," Proceedings of the EPRI Conference, (U.S.A. 1981).
Fraas, "Engineering Evaluation of Energy Systems," McGraw-Hill Book Co. pp. 121-125, (U.S.A.).

(Continued)

*Primary Examiner*—Alexa Doroshenk
(74) *Attorney, Agent, or Firm*—James Creighton Wray; Meera P. Narasimhan

(57) ABSTRACT

A process and apparatus for coal pyrolysis pretreatment. The apparatus is made up of a pretreatment vessel for holding a bed of coal particles, a preheater for heating the bed of coal particles to a temperature below the coal pyrolysis temperature range and an oxygen remover for removing oxygen released from the heated coal particles. The apparatus can also have a flue gas source as an oxygen removal sweep gas to the bed of coal, a collector for collecting non-condensable combustible gases, and the preheater having a furnace holding ceramic balls which are circulated from the furnace to the bed of coal particles. The process involves heating the bed of coal particles to a temperature below the coal pyrolysis temperature range and preventing air from contacting the bed of coal particles in addition to collecting non-condensable combustible gases or the preheating step accomplished by having a furnace holding ceramic balls which are circulated from the furnace to the bed of coal particles.

21 Claims, 14 Drawing Sheets

OTHER PUBLICATIONS

Carpenter, "Reaction Dynamics in Organic Chemistry," American Scientist, vol. 85, pp. 138-149, Mar./Apr. 1997 (U.S.A.).

Encyclopedia Britannica, "Coke, Coking and High Temperature . . . ", vol. 5, p. 982, 1950 (U.S.A.).

Lichty, "Internal Combustion Engines", McGraw-Hill Book.Co., pp. 40-47,. (U.S.A.).

Tsonopoulos et al., "Thermodynamic and Transport Properties . . . ", John Wiley & Sons, Chapter 10 (U.S.A.).

Doss, "Physical Constants of the Principal Hydrocarbons", The Texas Co., pp. 75-89 (U.S.A.).

Squires, "Reaction Paths in Donor . . . ", Applied Energy, vol. 4, 1978.

Howard et al., "Coal Devolatilization for Reactor . . . ", M.I.T.. Apr. 1981.

Hessley et al., "Coal Science . . . ", John Wiley & Sons, pp. 91-163, (U.S.A.).

Frederick et al., "Role of the Liquids from Coal . . . ", FNCOAL Corp. (U.S.A.).

Howard, "Coal Pyrolysis—Product Yields and Properties: Survey", Proceedings of the FPRI Conference, 1981 (U.S.A.).

Graves et al., "Diesel Fuels from Minimally Processed . . . ", Oak Ridge National Laboratory, DOE Contract DE-AC05-840R21400 (U.S.A.).

* cited by examiner

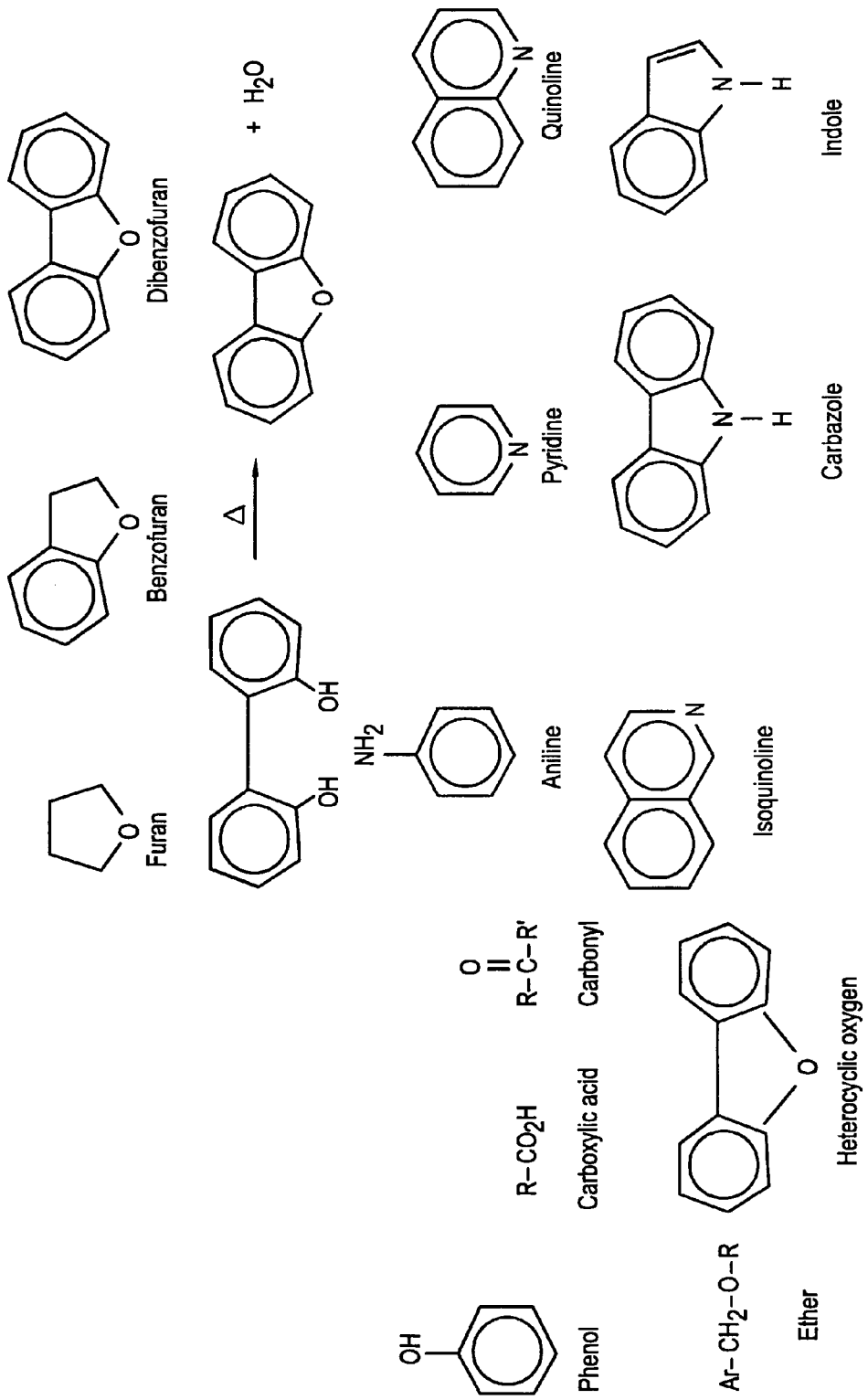
FIG. 3A-1 The most common form of heterocyclic oxygen is in furan ring systems

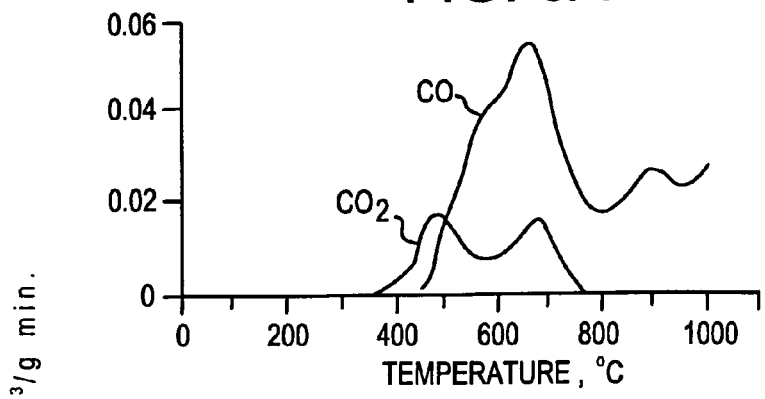
FIG. 6A
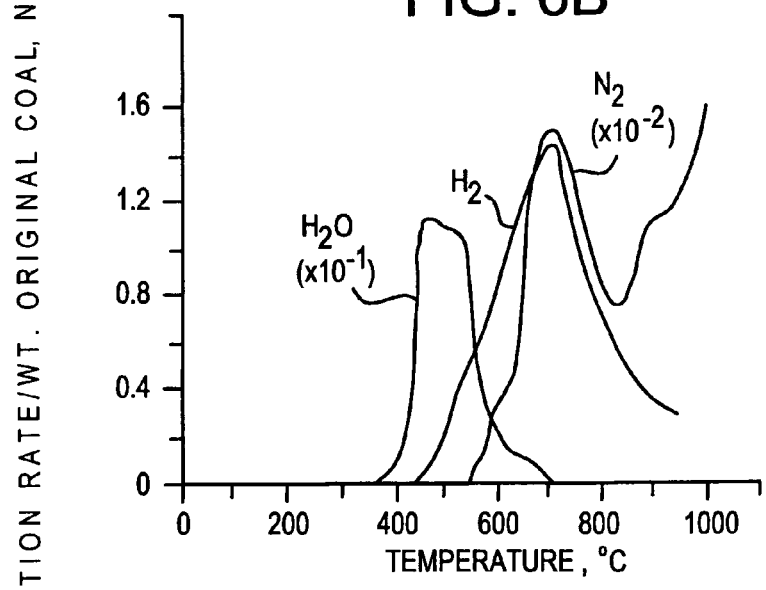
FIG. 6B
FIG. 6C

PRETREATMENT PROCESS TO REMOVE OXYGEN FROM COAL EN ROUTE TO A COAL PYOLYSIS PROCESS AS A MEANS OF IMPROVING THE QUALITY OF THE HYDROCARBON LIQUID PRODUCT

BACKGROUND OF THE INVENTION

The extraordinarily formidable difficulties presented by heavy black tar formation in processes designed to produce liquid hydrocarbons from coal by any pyrolysis process are indicated by the fact that these heavy tars have posed insuperable problems in over 60 y of major R&D projects all over the world, particularly in Germany, France, Great Britain, China, Japan, and the U.S.. The work in the U.S. is particularly well documented; major expenditures by the Bureau of Mines, the Office of Coal Research, D.O.E., and the big oil companies have failed to yield a commercial process. The only pilot plant sufficiently successful to continue in operation is the Encoal Plant operated by a subsidiary of the Ziegler Coal Co. in Gilbert, Wyo. with DOE funding. It operates on Powder River Basin sub-bituminous coal. The liquid product is tar of such a high viscosity (the pour point is about 90° F.) that it has been utilized only in boiler furnaces built to operate on No. 6 residual fuel oil. The main justification for operating the plant is that the char produced has been dewatered and its physical structure altered to reduce the moisture it can absorb so that its heat content per pound is much increased, and this reduces shipping costs.

The bulk of the literature on coal pyrolysis published in the past 50 years has been concerned with either small-scale bench tests with small quantities of coal—generally less than a gram—or pilot plants employing gas-fluidized beds with coal through-flows of a few tons per day. The experiments in the former were generally carried out under exquisitely controlled conditions, often with only a few particles of coal in a vacuum or an inert gas atmosphere; there is no mention of heavy black tar formation in these reports. However, in the literature on small pilot plants one finds that, whatever they might obtain in the way of a liquid product, it was generally a heavy viscous black tar. This was ordinarily attributed to polymerization of lighter hydrocarbons by a sort of catalytic action of a high concentration of activated carbon fines. These fines are inherently entrained with the hydrocarbon vapors from a gas-fluidized bed because the flow of sweep gas required to fluidize the bed of coal particles is many times the flow of vapor evolved from the coal so that a great deal of fine particles is swept up out of the fluidized bed and entrained in the sweep gas. While the larger particles can be removed in a cyclone separator, those in the micron size range are carried off with the hydrocarbon vapor to the condenser. This solid particle contamination of the hydrocarbon liquid amounts to about 10% by weight of the condensed vapor, and presents formidable filtering problems as well as liquid quality degradation caused by polymerization.

SUMMARY OF THE INVENTION

Tests in the inventor's lab have shown that the entrainment of fine particles in the pyrolysis vapors can be reduced by a factor of about 10,000 if the gas-fluidized bed is replaced by a vibration-fluidized bed such as that in the system shown diagrammatically in FIG. 1. Thus it was expected that heavy black tar would not be a problem in the new concept of a vibrated bed coal pyrolysis system. However, when tests with small vibration-fluidized bed systems were initiated, severe difficulties with black tar formation were encountered. Efforts to cope with these problems disclosed that heavy black tar formation presents far more complex and intractable problems than had been apparent in reviews of the literature covering the R&D work with gas-fluidized beds in which researchers were overwhelmed with difficulties in trying to cope with high levels of particle entrainment, mostly char, a specie of activated carbon.

Other factors contributing to the formation of heavy tars have been mentioned in the literature. The two most important of these were thought to be small amounts of oxygen that might get into the system in one way or another and act to polymerize the unsaturated hydrocarbons in the pyrolysis vapors, while the residence time of the pyrolysis vapors in the hot zone would determine the length of time that polymerization reactions would be likely to take place. In view of the fact that the solids content of the vapors leaving the vibration-fluidized bed is so low that a cyclone separator is not needed, the residence time in the hot zone can be kept far below that inherently required in gas-fluidized bed systems, hence the latter factor was not expected to be a serious problem. Oxygen in-leakage can be kept extremely low by designing and constructing the system to be quite leak-tight, and by operating it above atmospheric pressure so that any leakage that might occur will be gas leakage outward, not air leakage into the system.

A third factor barely mentioned in the literature was the possibility that oxygen might enter the pyrolysis process with the coal. While there are ample data in ultimate analyses on the amount of oxygen in the coal—commonly from 2 to 7%—nothing could be found on what fraction might be loosely bound and thus enter into polymerizing reactions, and what fraction might be tightly bound in stable molecules such as phenols and cresols that would not form active radicals that would initiate rapid polymerization reactions.

Basic Coal Chemistry

The term "coal" represents a class of carbonaceous substances formed over geological time beginning with decaying vegetation. Peat represents the first stage of the coalification process; as the process continues the moisture content decreases and the basic coal substance evolves hydrogen and oxygen as the percentage of carbon increases in the progression through the successive stages of lignite, sub-bituminous coal, bituminous coal, and anthracite which has a fixed carbon content of over 90%. The coals of primary interest for pyrolysis are the sub-bituminous and bituminous coals; these contain the largest percentage of volatile hydrocarbons that can be driven off by heating. "Pyrolysis" refers to the process of heating coal in the absence of oxygen to drive off and collect a mixture of gases and condensable vapors. The solid char residue contains essentially all of the mineral matter (ash) in the original coal, and perhaps half of the original volatile matter. Pyrolysis is also referred to as "carbonization" and as "mild gasification" in the D.O.E. Clean Coal Technology Program. In the pyrolysis process, as the coal is heated, moisture is evolved initially, then—as discovered by the inventors—loosely-bound oxygen is evolved up through about 350° F. Mild pyrolysis is arbitrarily defined as the temperature range from 330 to 650° C. This temperature range gives the best yields of hydrocarbons in the motor fuel volatility range.

The invention provides a coal pretreatment apparatus. A vessel holds a bed of coal particles. A heater heats this bed to a temperature in the 200° C. range, below the pyrolysis temperature of the coal. A vibrating machine produces and controls the flow of coal particles through the vessel. If a batch process is used batches of coal are moved from the pretreatment vessel to a pyrolysis retort, while preventing the entry of air that would contaminate the pretreated coal. Preferably the same apparatus is employed in such a way that it also serves to dry the coal.

A vibrating machine provides rapid mixing and heating of the coal stream entering the bed and particle motion and bed flow patterns such as to provide uniform exposure of individual particles to conditions giving a low partial pressure of oxygen with a relatively narrow spread in particle residence times.

A stream of hot furnace flue gas may be passed through a bed of hot char, coke or other material that will serve to remove any oxygen present so that flue gas can be employed as a sweep gas stream that has a low partial pressure of oxygen for heating and pretreating the coal feed to a pyrolysis process.

Another means of heating the coal in an atmosphere having a low partial pressure of oxygen is to employ non-condensable combustible gases in the off-gas from the pyrolysis process. This gas may be burned with less than the stoichiometric air flow rate and the resulting hot and very low oxygen content gas supplied to the pretreatment process provided that soot formation is avoided.

Ceramic balls of a larger size than the coal being processed might also be used as the heat transport medium to convey heat from a small furnace to the pretreatment bed. The larger ceramic balls can be screened from the pretreated coal and recycled through the furnace. The balls may be made of graphite, and the furnace might be fired with non-condensable combustible gases from the pyrolysis process. Geometric shapes other than spherical balls and/or materials other than ceramics can be employed if there are economic advantages to their use in place of roughly spherical ceramic balls.

Placement of the pretreatment vessel close to the pyrolysis vessel minimizes heat losses and possibilities for oxygen contamination of the pretreated coal before it enters the pyrolysis bed.

BRIEF DESCRIPTION OF THE DRAWINGS

FIG. 6 is a graphic prior art representation of gases released from coal during heating of the coal at a constant rate.

Figure 8:
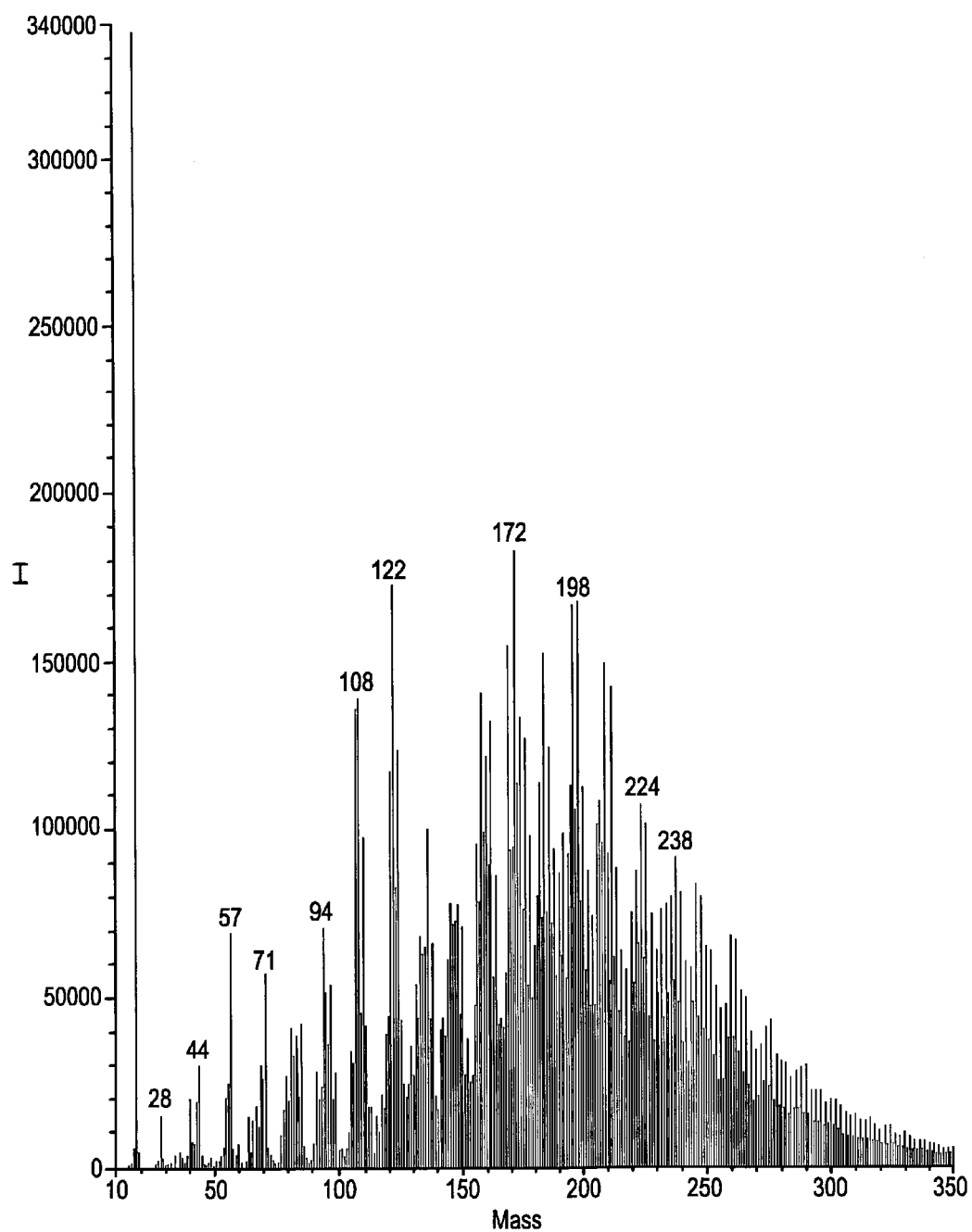
FIG. 8 is a representation of a mass spectrograph for the liquid pyrolysis product obtained after pretreatment of coal at 450° F. to remove oxygen.

Table 1 is an identification of the molecular species shown in the mass spectrograph of FIG. 8.

Table 2 is a summary of the results of the tests of the gaseous products shown in Table 1.

DETAILED DESCRIPTION OF THE PREFERRED EMBODIMENTS

Figure 1:
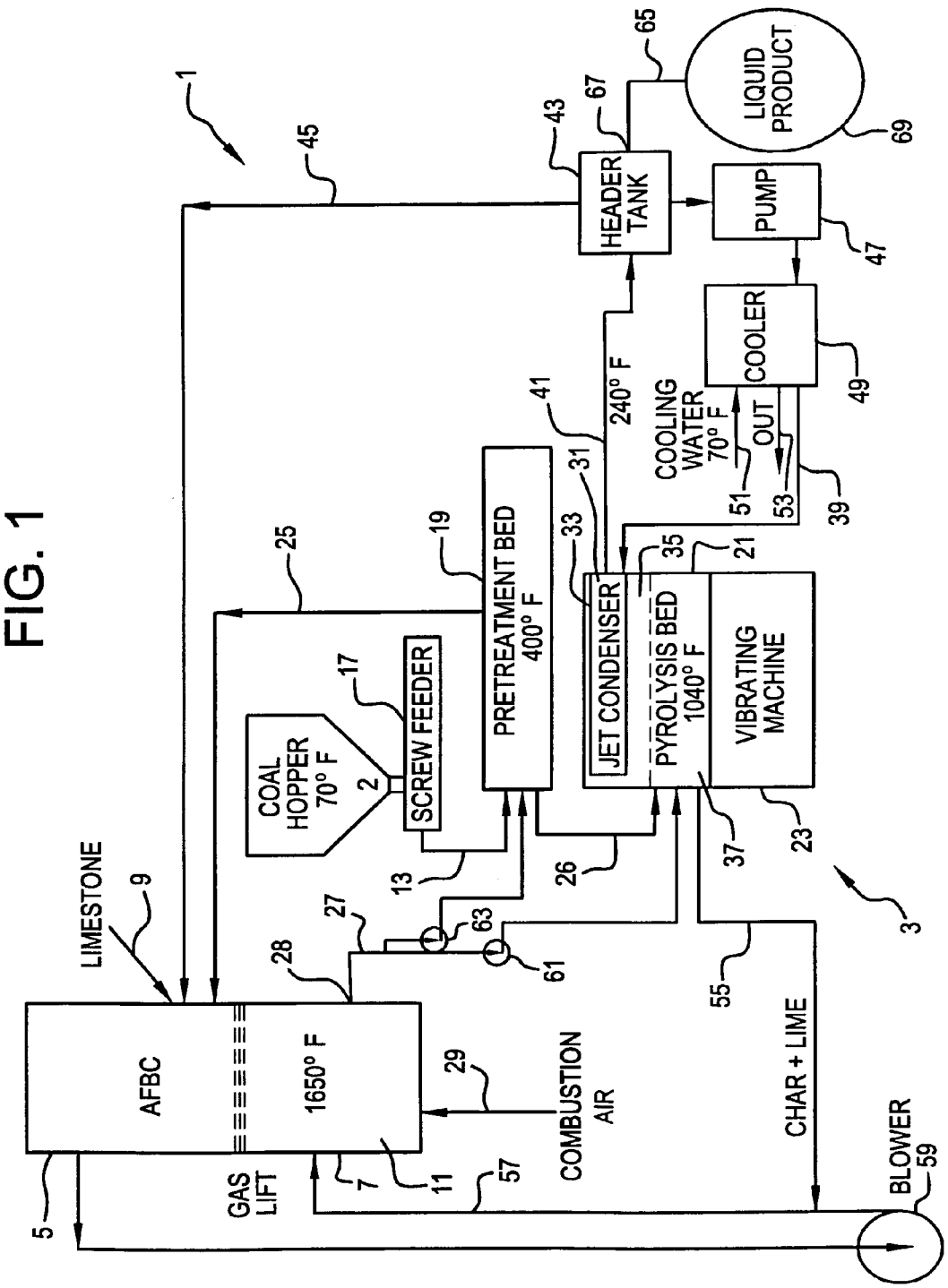
FIG. 1 is a schematic representation of a vibrating bed pyrolysis system with a pretreatment bed to remove oxygen.

There are many ways in which the invention can be employed in a power plant utilizing a fluidized bed combustor. FIG. 1 shows a representative coal converter and combustor system 1 in which the vibrated bed pyrolysis system 3 is coupled to an atmospheric fluidized bed coal combustion furnace 5, commonly referred to as an AFBC. The fluidized bed 7 in this type of furnace usually consists mostly of limestone 9 or dolomite that calcines on heating to form CaO, a sorbent that gives good retention of the $SO_2$ formed from the sulfur in the coal as it is burned at a temperature in the 1500 to 1650° F. range. Thus the bulk of the solid particles 11 in the bed are CaO coated with a hard layer of $CaSO_4$. Crushed coal 13 is fed from a supply hopper 15 through a screw feeder 17 to a vibrating bed coal deoxygenator 19 mounted next to the vibrating bed pyrolysis retort 21. The two vibrating beds are mounted on a vibrating machine 23. The deoxygenator preheats the coal to around 400° F. to drive off the loosely bound oxygen as well as the superficial moisture before the coal enters the pyrolysis bed, which will commonly operate in the temperature range of about 1000° F. to 1250° F. for the highest yield of liquid products (depending on the coal used).

The pretreatment bed serves to remove the oxygen, moisture and the majority of the fine particles from the coal before it reaches the pyrolysis bed. The oxygen, water vapor, and coal fines are flowed to the combustor 5 through pipe 25 for burning the fines. The crushed coal particles and the hot solid particles from the combustor flow to the pyrolizer 21 as shown by line 26.

The point at which the sorbent stream 27 is tapped 28 from the combustor is chosen to minimize the amount of fines, and the high combustion air flow 29 through the fluidized bed in the furnace will naturally carry off practically all of the smaller particles as they are generated by attrition in the AFBC. Thus the amount of fine particles available for elutriation from the pyrolysis bed is minimized. Including the deoxygenator 19 in the system is also advantageous in that it preheats the coal and increases the heating rate of the particles as they enter the pyrolysis bed. Further, the deoxygenator reduces moisture contamination of the product liquid.

To minimize the time that the product vapor is exposed to high temperature, a jet condenser 31 enclosed within a thermally-insulated sleeve 33 is mounted in the freeboard 35 above the pyrolysis bed 37 to quench the hydrocarbon vapor product with a recirculated stream of the product liquid that has been cooled, typically, to just above the boiling point of water; operating the condenser 31 in this temperature range minimizes the amount of moisture in the hydrocarbon condensate 41. The spray of droplets provides a large surface area in a compact, direct-contact condenser whose effectiveness will not be degraded by the formation of tarry deposits on heat transfer surfaces. The liquid and gaseous pyrolysis products 41 leaving the jet condenser drain down to a header tank 43 having sufficient volume so that the liquid collects in the lower part of the tank while the uncondensable vapors and gases 45 leave at the top and flow to the AFBC furnace along with the water vapor 25 leaving the dryer.

The quench liquid 39 is pumped to the jet condenser 31 by the pump 47 through the cooler 49, where it is cooled by flowing ambient water 51 in and hot water 53 out.

The stream 55 of char and sorbent leaving the pyrolysis bed is returned to the AFBC furnace by a gas lift 57 driven by a blower 59. The power required to drive the vibrating machine 23 and the gas lift blower 55 is about 0.1% of the net plant electrical output. That compares with about 0.6% for the power required for the coal pulverizers in a conventional pulverized coal-fired steam power plant.

The flow 27 of hot sorbent from the AFBC to the vibrating beds is controlled by L-valves 61 and 63 that also serve as flow meters.

Product liquid 65 drains out through an overflow port 67 in the header tank 43 into the storage tank 69.

From the environmental standpoint, the emissions are the same as for fluidized bed combustors fired with raw coal in the conventional fashion; installation of the pyrolysis system does not require any additional equipment to control emissions.

The vibrating bed pyrolysis system is equally applicable to bubbling or entrained fluidized bed combustors, and can be used with atmospheric or pressurized fluidized bed combustors. The space required for the equipment of the vibrating bed pyrolysis system is about the same as for coal pulverizers in a conventional pollverized coal boiler installation.

Figure 2:
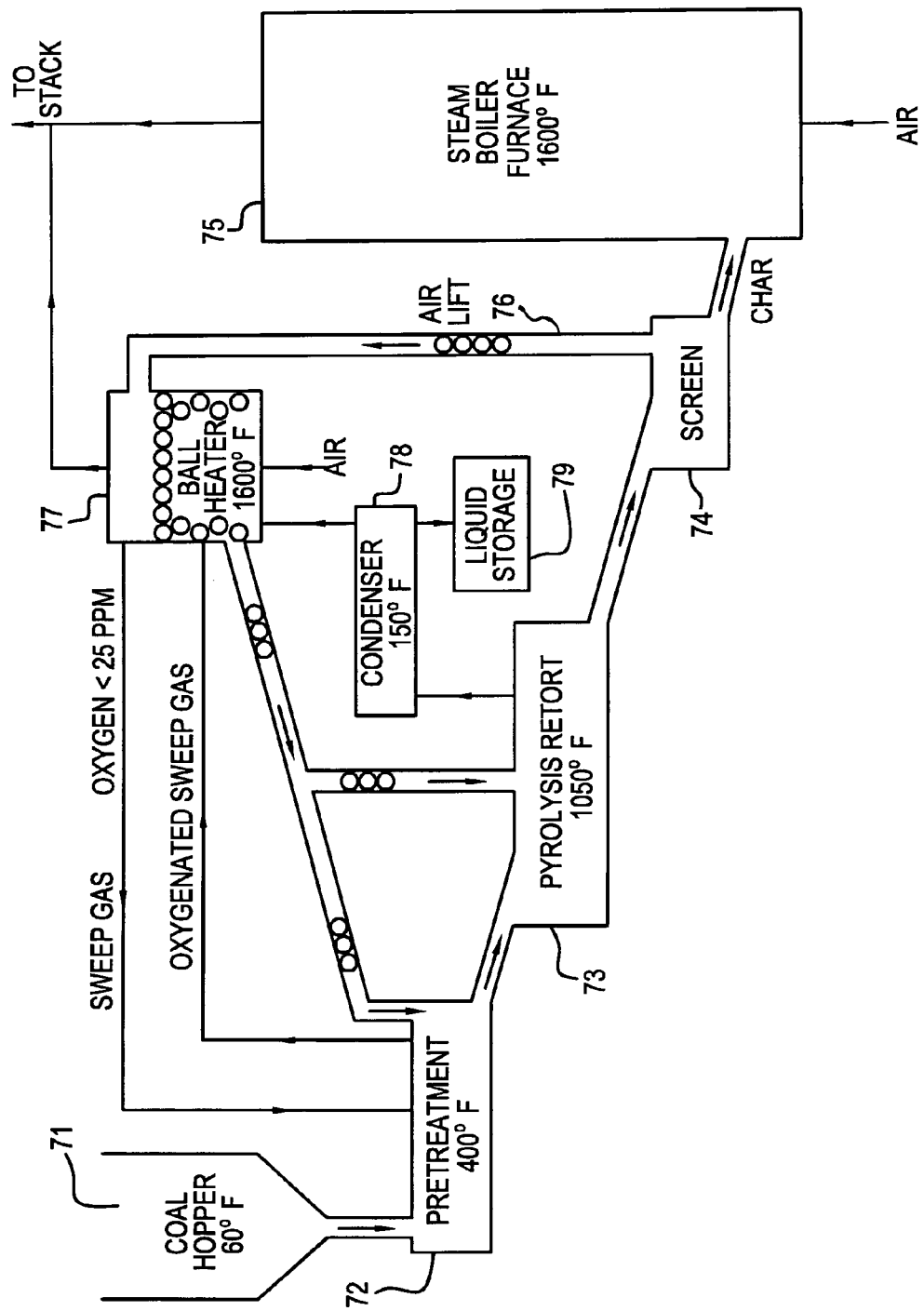
FIG. 2 schematically shows a coal pretreatment system incorporated in a pyrolysis process utilizing ceramic balls for transporting heat between components.

FIG. 2 shows another representative coal pyrolysis system that employs ceramic balls as the process heating medium rather than the hot lime-ash material from a fluidized bed combustor as in the process of FIG. 1. In the process of FIG. 2 the raw crushed and screened coal flows from the coal hopper 1 to the pretreatment vessel 2 en route to the pyrolysis retort 3. A mixture of char from the coal and ceramic balls flows out of the retort 3 to a screen 4 in which the char particles, which are relatively small, fall through the screen and flow into the steam boiler furnace 5 where the char is burned to fuel the boiler. The ceramic balls are sufficiently larger than the crushed coal so that they are skimmed off by the screen 4 and are conveyed upward via an air lift 6 to a ball heater 7. A portion of the heated balls flows out of the heater 7 to the pretreatment vessel 2 to heat the raw coal to around 400° F., while the balance of the heated balls flows to the pyrolysis retort 3 to provide the heat required for the pyrolysis process which operates at a temperature of around 1050° F. The vapors and gases driven out of the coal in the pyrolysis process flow upward to a condenser 8. The condensate drains down to a liquid storage tank 9 while the non-condensable gases flow upward to the ball heater 7 where they are burned with air in a mixture less than stoichiometric so that the oxygen concentration in the gases leaving the ball heater is less than 50 ppm. A portion of this gas flows to the pretreatment vessel 2 as a sweep gas to carry off the oxygen evolved in the pretreatment process. After picking up oxygen from the coal, that gas with its increased oxygen content is returned to the ball heater 7 where the oxygen is consumed by combustion of the pyrolysis gases.

Figures 2, 3A:
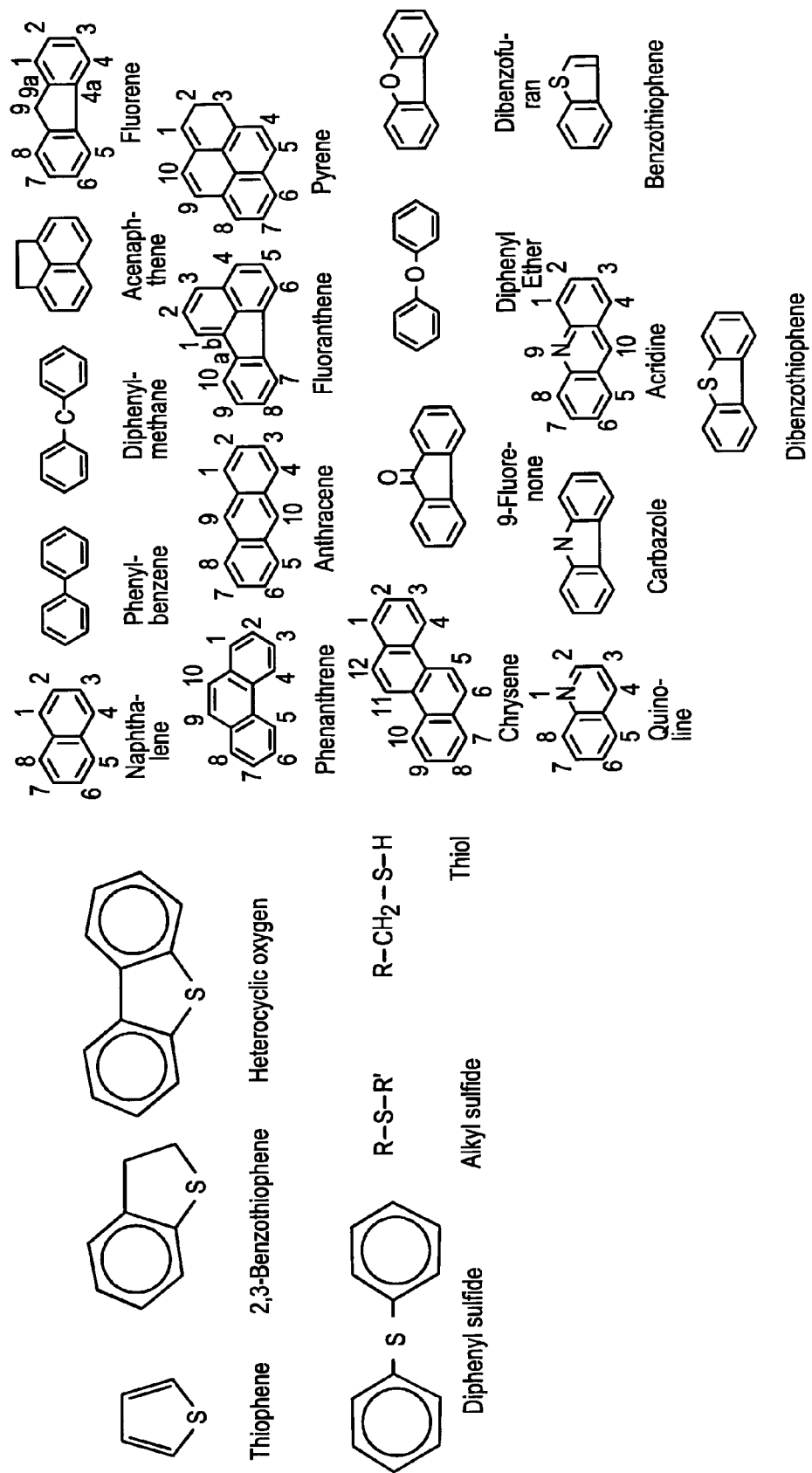
FIG. 3A schematically represents the elements of molecular structures in coal including the occurrence of oxygen, nitrogen, and sulfur.
Figure 3B:
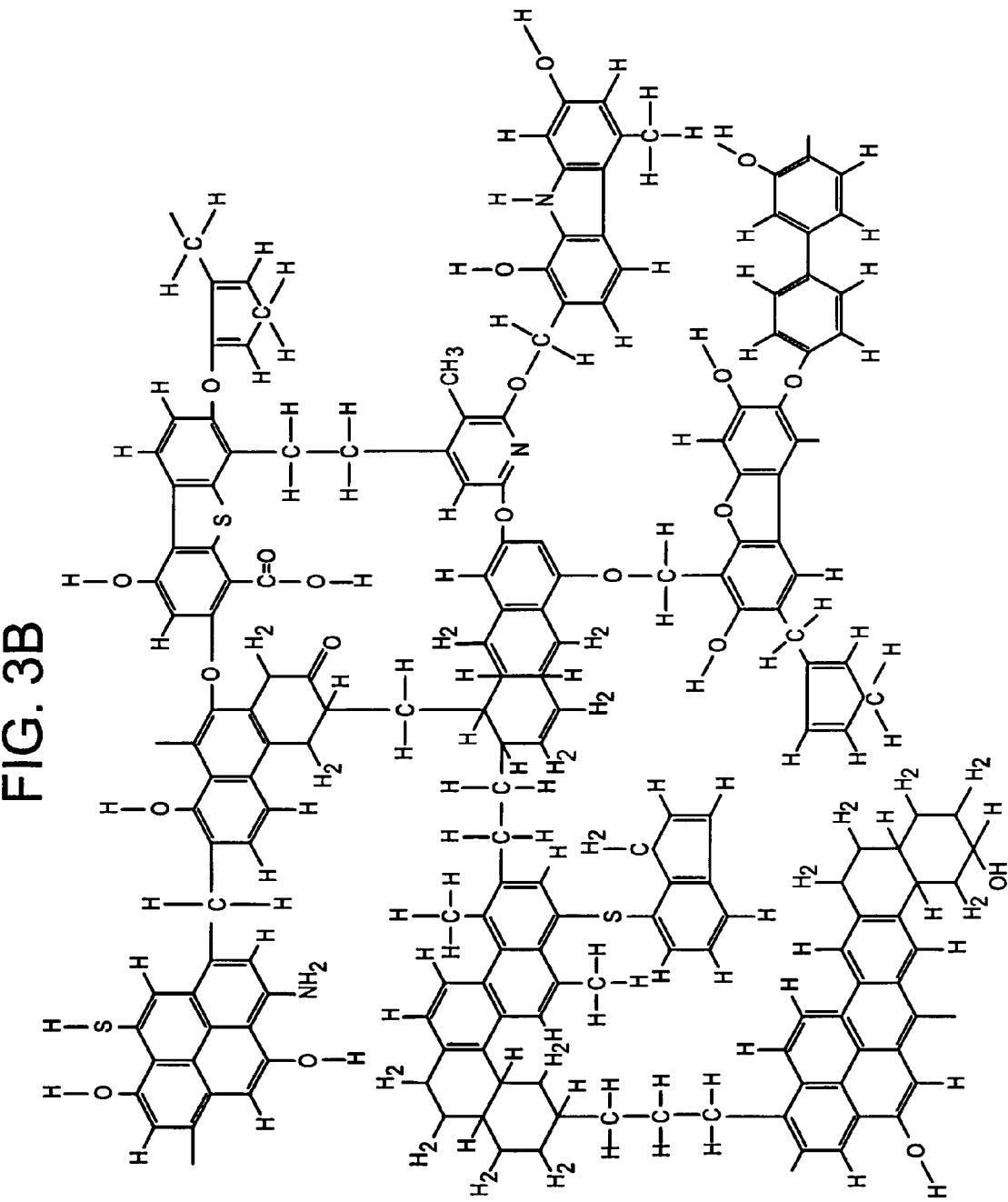
FIG. 3B is a schematic representation of structural groups and connecting bridges in bituminous coal.

At the risk of over-simplification, it seems worthwhile to take a brief look at the coal chemistry involved and examine some diagrams of the structure of some hydrocarbons obtained in coal pyrolysis. Coals are polymers, but since coals differ widely, no single molecular structure can represent all coals. Typical elements of the structures are shown in FIG. 3A, while a synthesized model of a typical coal polymer is shown in FIG. 3B. When heated above about 550° F. in pyrolysis in an oxygen-free non-reactive gas atmosphere, some bonds in a structure such as that of FIG. 3B are more easily broken than others, and breaking of these bonds sets free some lighter hydrocarbon molecules. Flash pyrolysis bench tests indicate that, for flash pyrolysis at temperatures in the range of 1000° F., these hydrocarbons have an average molecular weight of about 180. Prof. A. M. Squires uses the term scissile bonds for the more readily broken bonds, and cites "hydrogen bridges, simple ether linkages between aromatic structures, and benzyl—benzyl carbon bonds—breaking in that order if the coal is heated slowly".

Searches of the literature have failed to find any quantitative data on the relative importance of each of the three factors that have been believed to affect heavy black tar formation, i.e., the entrained carbon particle content of the vapors leaving the retort, the residence time of the hydrocarbon vapor in the hot zone, or the amount and form of oxygen that might enter the system with the coal. However, after extensive tests of small-scale pyrolysis systems in the inventor's lab, it became evident that heavy black tar formation in the vibrating bed coal pyrolysis system took place so rapidly in the pyrolysis retort that it must have stemmed from rapid reactions in the gas phase, so rapid that there is no practicable way of reducing the residence time in the hot zone sufficiently to avoid them. Under any of the test conditions investigated, this tar presented such pernicious and subtle difficulties that test systems especially designed for investigation of the problem were badly needed. Several such systems were built and tested; the results from these experiments led to a system that has consistently yielded low viscosity liquid, and this is the process presented in this patent.

There is nothing in the literature to indicate the precise sequence of the chain reactions involved in these rapid gas-phase polymerization reactions triggered by free oxygen in the pyrolysis retort. These reactions are so complex that it is exceedingly difficult to make experimental determinations of the steps in the reactions. An excellent recent paper by Carpenter, cited as a reference, indicates that the dynamics of these reactions is so complex that an analytical solution seems out of the question.

Inventors' Experiments $O_2$ and CO Release from the Coal

While there are many mentions in the literature of oxygen as a probable cause of heavy tar formation, the quantitative data on possibly acceptable oxygen concentrations found in the literature weren't very helpful. Most of the quantitative data on oxygen in coal were in ultimate analyses that cited values commonly running from 2% to 7% $O_2$ by weight of the coal, but these references gave no indication of what fraction of that oxygen might come off as free oxygen when the coal was heated and what fractions might come off as $H_2O$, CO, $CO_2$, phenols, cresols, or other more complex compounds.

Figure 4:
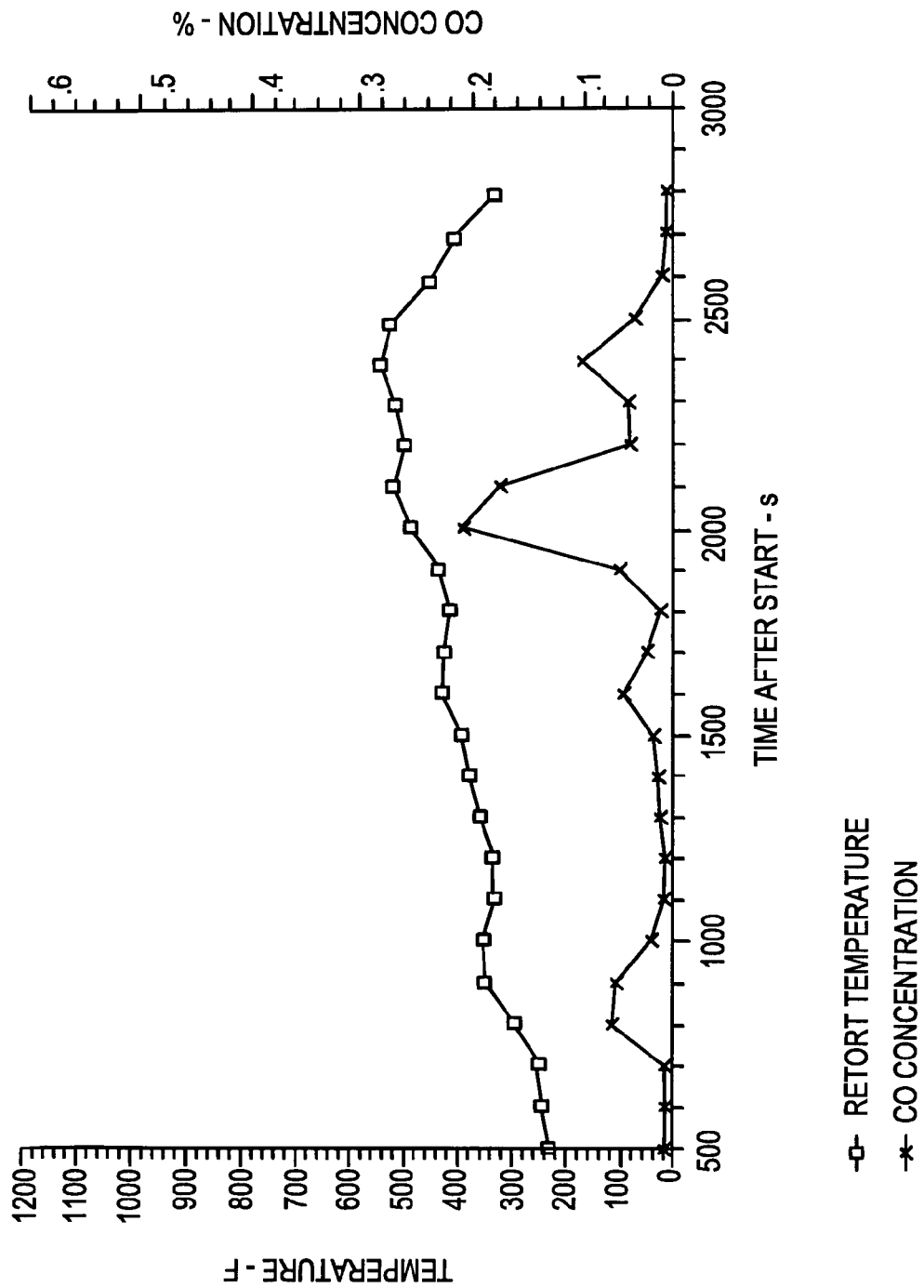
FIG. 4 represents results of a preliminary study of percent CO concentration in exhaust gases in relation to the temperature in degrees fahrenheit for heat pretreatment of coal.
Figure 5:
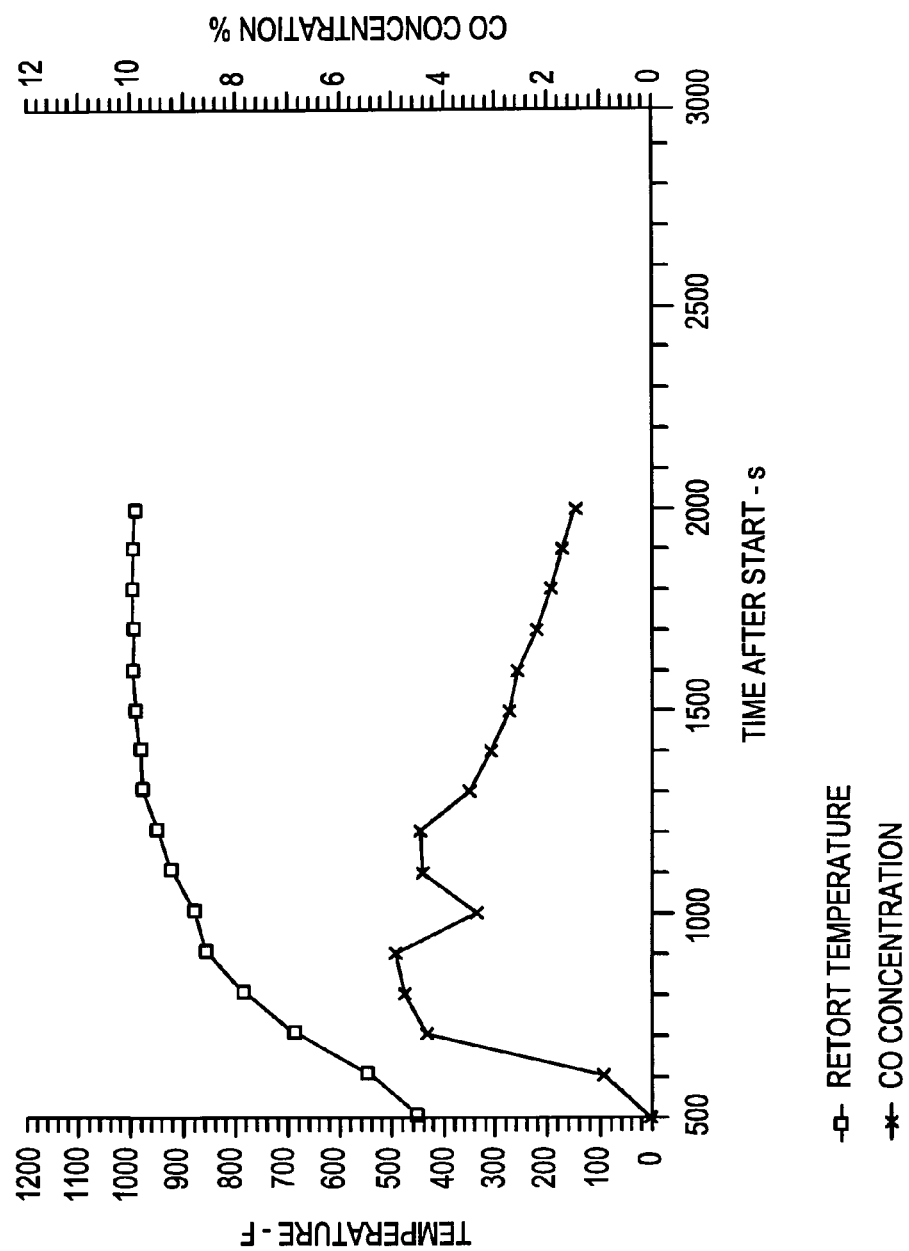
FIG. 5 represents carbon monoxide percent concentration in exhaust gases from a pyrolysis retort during a pyrolysis process.

The inventors' tests began with an investigation to determine the release of CO as a function of heating time in a nitrogen atmosphere because a CO meter was readily available. These tests yielded curves for the CO concentration in the exhaust gas as a function of time such as those in FIGS. 4 and 5 for the pretreatment and pyrolysis processes respectively. These curves show high CO release rates in sporadic bursts that occurred during slow heating at particular temperatures of about 121, 177, 232, 288, and 510° C. (250, 350, 450, 550 and 950° F.). The high releases found at low temperatures are remarkably different from the complete absence of CO releases up to a temperature of 450° C., or 850° F., shown in FIG. 6, which is typical of those in the literature. Note that these system tests indicate that the CO release comes in bursts at particular temperature regions, at least for the coals tested.

Figure 7:
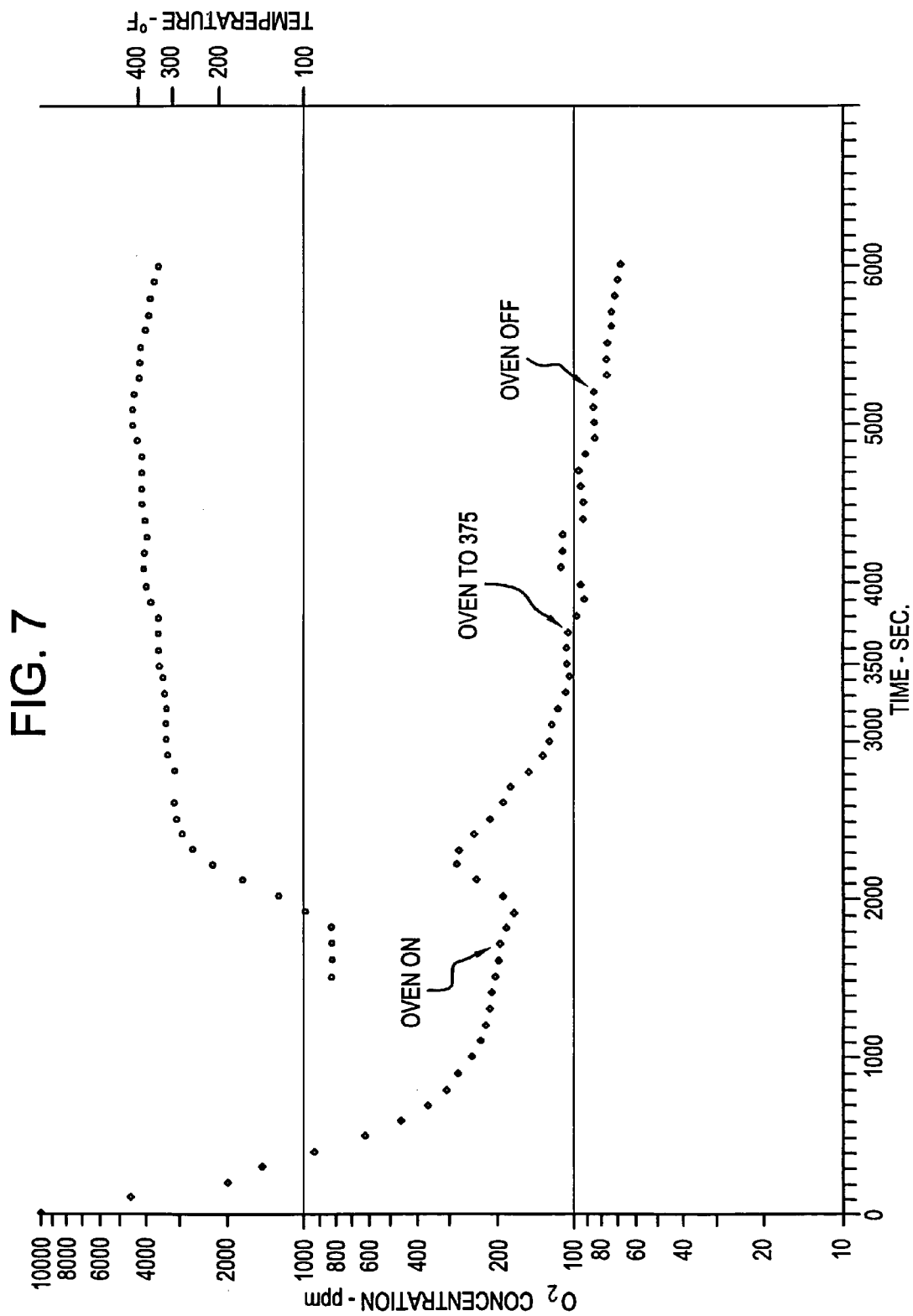
FIG. 7 is a graphic representation of oxygen concentration in the off-gas during pretreatment as a function of time from the initiation of a nitrogen purge.

When an oxygen meter became available, the same test procedure employed for the CO release rate was followed. The degassing pretreatment was started at room temperature and the oxygen concentration and coal temperature were observed as a function of time. The results are shown in FIG. 7. While the amount of oxygen evolved is much less than the amount of CO, it is still substantial; oxygen is released even at room temperature when the coal is treated with a sweep gas having an oxygen concentration below 50 ppm so that the oxygen partial pressure is of the order of 50 $\mu$m of Hg. When the coal is heated, as in the cases for which the CO release rate was measured, bursts of oxygen release occur at about 121, 177, and 204° C. (250, 350, and 400° F.). No further releases of oxygen at temperatures above 400° F. have been observed. The effectiveness of this pretreatment of the coal in removing oxygen to yield a low viscosity liquid hydrocarbon product from a pyrolysis system has now been demonstrated in ten different tests with a small pyrolysis system. When a test tube containing the product liquid is shaken, the liquid is not a heavy black tar but appears to have the viscosity of No. 2 fuel oil, i.e., not much greater than water. Six other tests with the same pyrolysis system but without the pretreatment have all yielded only a heavy black tar with a viscosity so high that it has taken many seconds for a few cubic centimeters to flow from one end of a test tube to the other with an inclination of about 20 deg.

Polymerization Mechanisms

A key element in the inventors' development of this new pretreatment concept is the discovery that there appear to be two distinctly different contaminants that are responsible for the production of the heavy black tars that have plagued all previous coal pyrolysis systems. The first contaminant is in the form of fine particles of char (a specie of activated carbon) that act as catalysts to polymerize unsaturated liquid hydrocarbons at a relatively slow rate over a period of days or weeks at room temperature. The second contaminant is free oxygen which at pyrolysis process temperatures forms active ions that trigger rapid polymerization reactions that take place in times of the order of a second. Thus the first step in avoiding heavy tar formation is the use of a vibration-fluidized bed to reduce the solid particle content of the pyrolysis vapor by a factor of at least 10,000 over that for gas-fluidized beds. This is a necessary but not sufficient condition; it is also essential that the oxygen concentration in the pyrolysis retort be kept to extremely low levels. To accomplish this the oxygen content of the sweep gas must be kept below about 50 ppm, and the adsorbed or loosely bound oxygen in the coal fed to the process must be largely removed by a pretreatment process as described in this patent application.

Significant Observations

One of the most significant observations made in the course of the inventors' experiments was that in a glass retort test a yellow fog of aerosol droplets began to form a few millimeters above the free surface of the coal and was carried off to the condenser with the sweep gas. A dark orange varnish deposit appeared on the glass walls of the retort and the passages to the condenser, and a viscous dark liquid deposit built up on the ice-water-cooled wall of the condenser. When an oxygen meter was procured it was found that laxity in refilling a nitrogen cylinder at the gas supplier had given an oxygen content of 53 ppm in the nitrogen instead of the 3 ppm maximum nominally specified. This test showed the rapidity with which a small amount of oxygen in the nitrogen sweep gas induced polymerization of light hydrocarbon vapors into tars whose boiling point was so high that they immediately condensed into micron-size droplets before the vapor had moved into a lower temperature region. The superficial velocity of the vapors leaving the surface of the bed of coal particles was about 3 mm/s indicating that the aerosol particles were produced in roughly a second. In this and other experiments microscopic examinations disclosed that the aerosol droplets of tar were sufficiently sticky that they tended to agglomerate into clusters and deposit out on walls or in filters, commonly as clusters of microspheres. Similar deposits of tar microspheres were found in all of the tests in which a yellow "smoke" was observed where glass elements permitted direct observations.

The use of freshly-crushed coal coupled with a drying heat treatment had avoided heavy tar formation in some ORNL coal pyrolysis tests carried out by R. Graves in 1983. In these tests the coal was heated slowly in static batches so that there was no evolution of fines with the vapor. The batches were well sealed and swept with high purity argon. The inventors carried out a seemingly similar drying operation for a vibrating system test, but got heavy black tar. However, the ORNL drying was carried out in an argon atmosphere with a strong sweep gas flow of pure argon, whereas the coal drying for the inventors' test was done in air, which permitted continuous oxidation and/or CO formation even while some oxygen or CO might have been driven off.

Experiments by previous investigators have included many other measures that might serve to improve the quality of the product liquid by reducing the amount of unsaturated hydrocarbons. These measures include using sweep gases other than nitrogen, e.g., hydrogen, steam, CO, $CO_2$, He, A, methane, or a good hydrogen donor such as tetralin (see FIG. 2), and will be investigated in future tests. Different types of coal are likely to behave differently, and the temperatures used at different stages in the process may prove important. Yet another factor may be the heating rate.

Composition of Liquid and Gaseous Products

Figure 9:
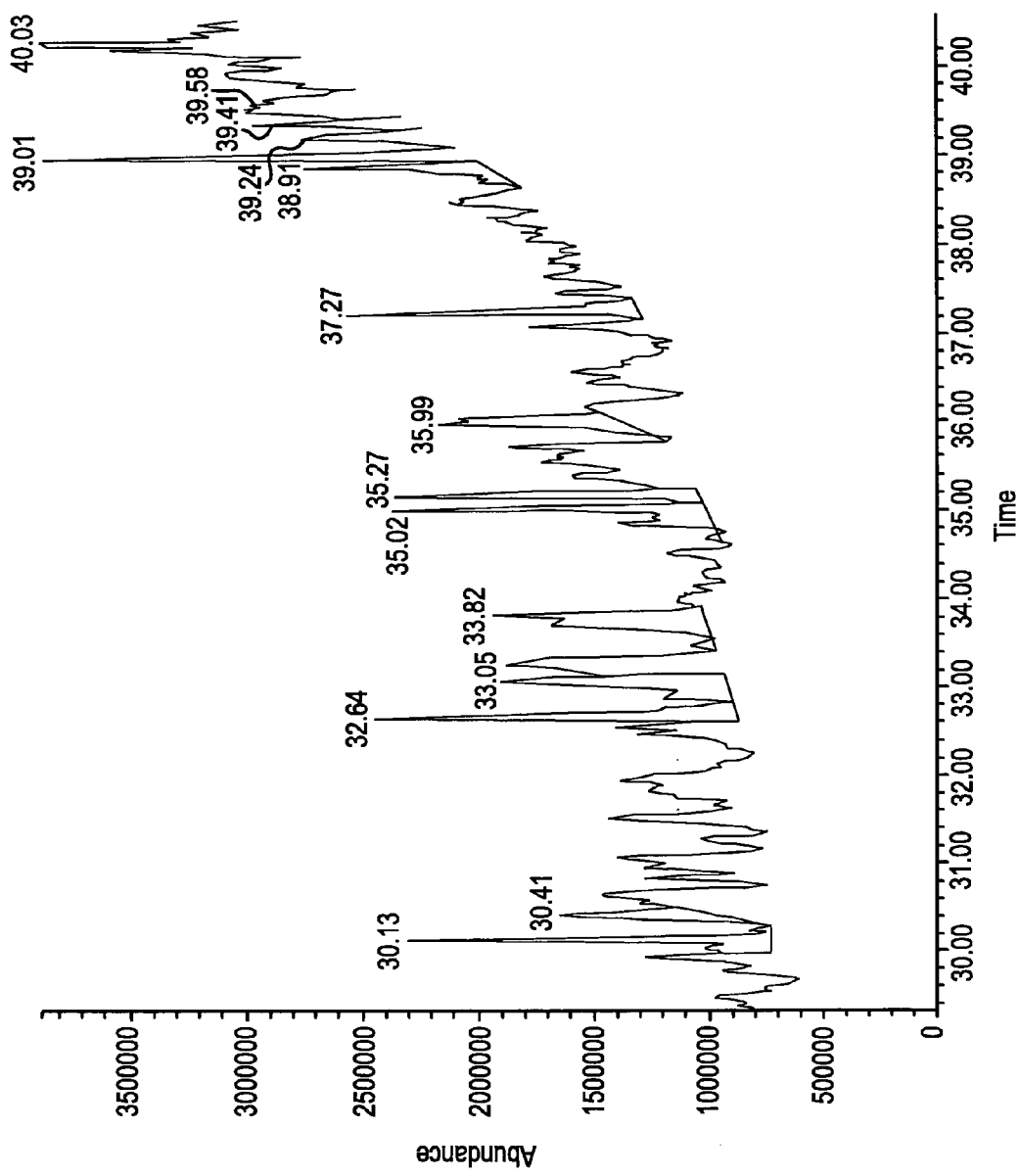
FIG. 9 is an expanded version of the molecular weight region from 30 to 40 for the data shown in FIG. 8.

Arrangements were made for analyses of samples of the liquid and gaseous products from a pyrolysis test run with pretreated coal. The analyses were carried out by personnel at NREL who have been working on the pyrolysis of wood wastes. A mass spectrograph test of the liquid yielded FIGS. 8 and 9 from which they prepared Table 1. Table 2 summarizes the results of the NREL tests of the gaseous product. A particularly significant result is that the mass spectrographic analysis of the liquid product showed no sign of sulfur, sodium, or potassium, hence this liquid should be usable as a gas turbine fuel with no need for refining other than possibly a simple filtration operation. However, the product liquid should be fed to burners within 3 weeks of its production because after 3 weeks it begins to polymerize and become viscous.

Hydrocarbon Losses in the Pretreatment Process

Three charts have been prepared to make quick estimates of the possibility of serious losses of the lighter hydrocarbons in the sweep gas if one looks simply at their vapor pressures. Actual losses should be much lower because these hydrocarbon groups are chemically bound in the coal polymer, but the bonds for some are sufficiently weak so that they may be broken at temperatures below 316° C. (600° F.). If they are released from the polymer, and if the nitrogen sweep gas flow is made sufficiently high to carry off water vapor and oxygen expeditiously, these charts show that hydrocarbons in the motor fuel volatility range have vapor pressures sufficiently high that appreciable quantities may be carried off in the sweep gas. Thus a key question is the rate at which lighter hydrocarbons may be released from the polymer as a function of temperature.

Figure 10:
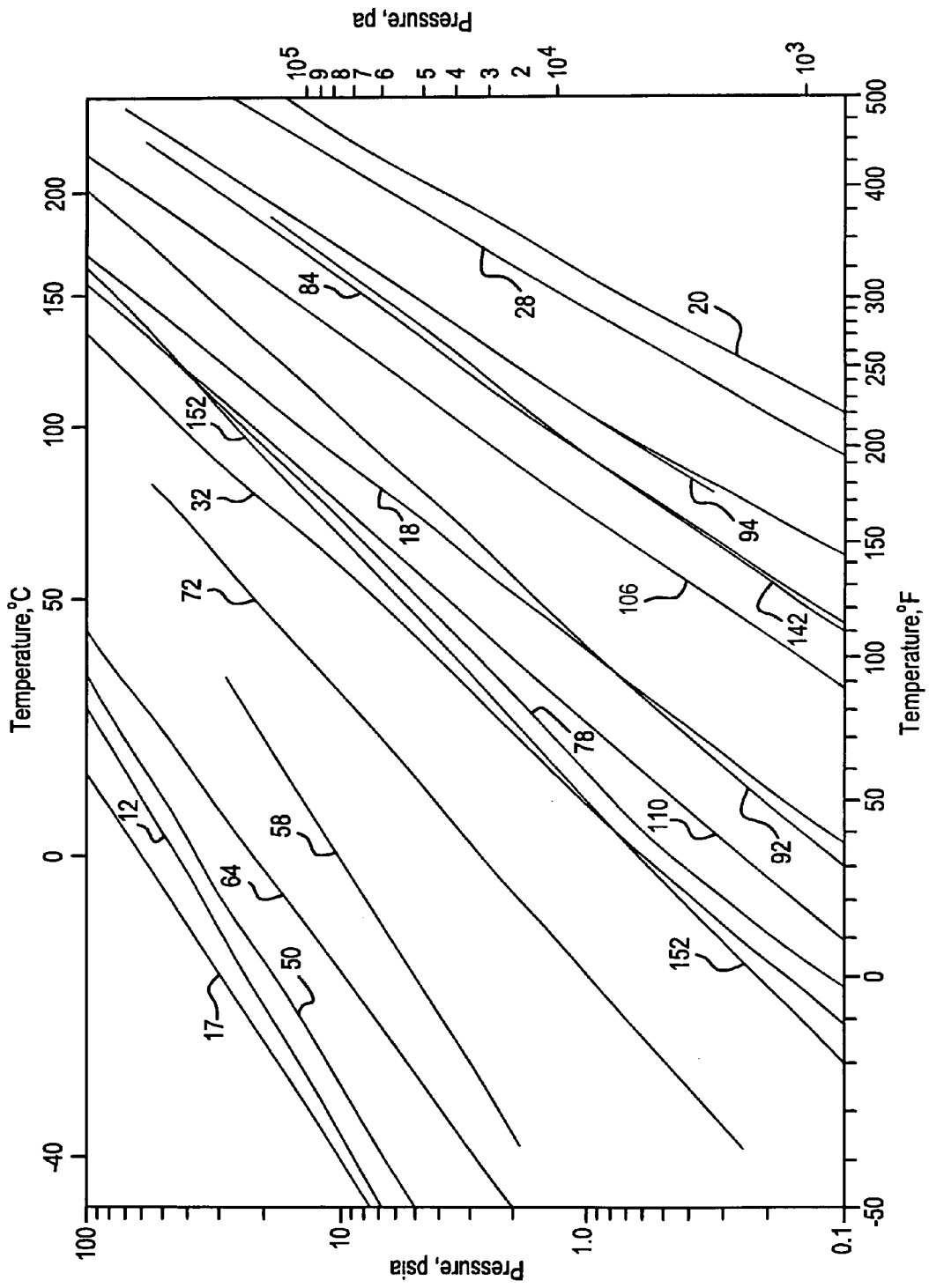
FIG. 10 is a graphic representation of effects of temperature on vapor pressures of typical liquids.

The first chart, FIG. 10, is for the vapor pressures of some typical liquids as a function of temperature. This was prepared to investigate the question for short periods of coal exposure at pretreatment temperatures. It shows that the vapor pressures of motor fuel hydrocarbons can easily run in the range 10 to 100 mm in the 100 to 500° F. temperature range. Instrumentation is available to obtain rapid responses to hydrocarbon concentrations in nitrogen in the range of 10 to 30,000 ppm. While these instruments normally read in percent or in ppm by volume, the construction of charts is simplified if the values are in terms of ppm by weight rather than by volume.

Figure 11:
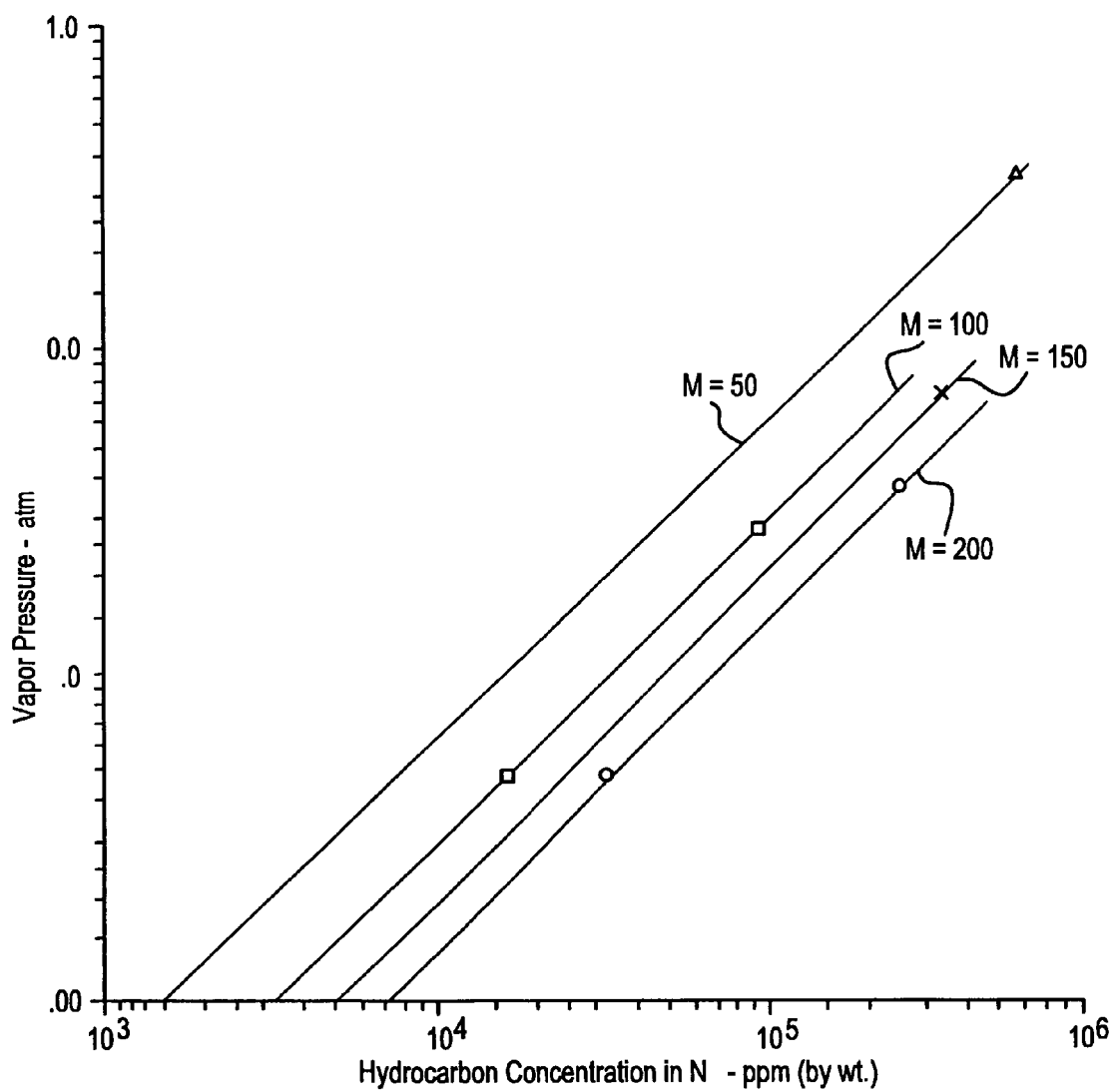
FIG. 11 is a graph of vapor pressure as a function of hydrocarbon concentration.
Figure 12:
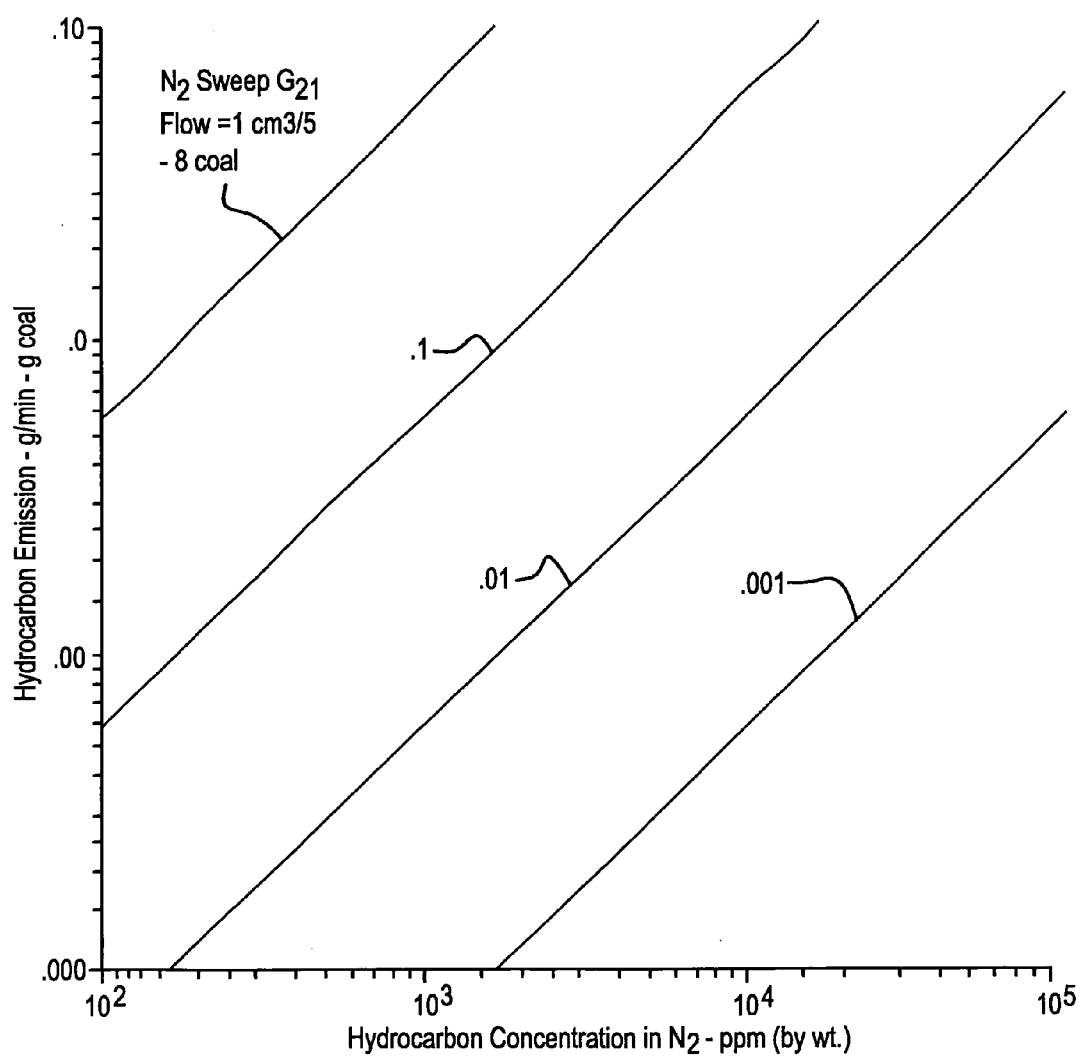
FIG. 12 is a chart showing hydrocarbon emission as a function of concentration in nitrogen.

FIG. 11 was constructed from FIG. 10 to show the hydrocarbon concentration in nitrogen expressed in ppm by weight as a function of the vapor pressure for some typical species differing widely in molecular weight. FIG. 12 was derived from FIG. 11 to give the hydrocarbon emissions in terms of grams per minute per gram of coal as a function of the hydrocarbon concentration in ppm by weight. Values are plotted for a series of sweep gas flow rates expressed as cubic centimeters per second per gram of coal in the retort. The formula used in preparing each chart is shown at the top of the chart.

These charts show that one can easily lose the bulk of the lighter hydrocarbons obtainable from coal if they are released from the polymer. Thus the key question becomes the rate at which they are released from the coal polymer as a function of temperature. One suspects that each specie may be released in little bursts as is the case with CO.

Amount of Oxygen to Produce a Substantial Amount of Tar

A key question is the amount of oxygen contamination that might produce a significant amount of heavy black tar. If one assumes a molecular weight for the tar of 3200, and that one atom of oxygen might induce the polymerization of a molecule of tar, the weight of oxygen would run 0.5% of the tar. Turning to sources of oxygen, Table 3 gives data for the removal of oxygen from a coal sample by degassing at temperatures up to 600° F.; the oxygen removed ran 0.178% of the product liquid. Other tests gave similar values. If the nitrogen sweep gas is contaminated with 50 ppm of oxygen as in the case of Table 3, the amount of oxygen would run almost ten times greater, or about 1% of the product liquid. These very crude estimates indicate that the amounts of oxygen in the nitrogen sweep gas during the pyrolysis process and the amount of oxygen removed from the coal in the pretreatment process may be sufficient to explain the tar formation. Further, note that observations in some glass system tests showed that films of tar on the condenser-test-tube wall were too viscous to flow, but, when the test tube was shaken, the low viscosity liquid in the bottom of the test tube quickly washed the viscous tar off the walls. Thus the viscosity of the hydrocarbon liquid product of pyrolysis is doubly sensitive to the formation of a small amount of tar because any tar that is formed reduces the amount of solvent available to reduce the tar viscosity. Anyone who has poured a little gasoline into roofing tar knows that it doesn't take much gasoline to thin the tar from a stiff paste to a liquid that handles well with a paint brush.

The pretreatment process for removing the oxygen that would otherwise be evolved from the coal as molecular oxygen during the coal pyrolysis process entails sweeping the coal particles with a gas containing less than 100 ppm of oxygen while heating the coal to around 200° C. (392° F.). While this might be done in many different ways, a typical system employing a complex-mode vibration-fluidized bed is shown in FIG. 1. The vibratory mode should be chosen to provide good continuous mixing of all of the coal particles in the bed with the sweep gas, and a narrow spread in the transit times of the particles circulated through the bed so that they are processed to give a uniformly low content of oxygen that will be released as molecular oxygen during the pyrolysis process. This also implies that the vibration mode should be such that the particles will be heated rapidly to the pretreatment process temperature, and that the bed temperature should be uniform. Further, the bed temperature should be controlled to be sufficiently high and the residence time sufficiently long to remove most of the molecular oxygen and thus reduce the oxygen release during pyrolysis to an acceptable level. At the same time, the pretreatment temperature should not be so high or maintained so long as to result in serious losses of hydrocarbon vapors. Appropriate values for these parameters will depend on the particular coal being processed as well as the market price dependence on the quality of the product liquid. Other factors influencing these choices include the character and features of the particular pyrolysis process and the effectiveness of additives to the liquid product. For example, additives such as hydrogen donors like tetralin may be desirable as a means of extending the storage life of the liquid.

The bed for the pretreatment process might be heated in any of many different ways including gas-firing, electric resistance, or microwave heaters. The system chosen for heating the bed of FIG. 1 is a by-pass stream of hot sorbent particles circulated from a fluidized bed combustion furnace so that the sorbent flows directly into the stream of coal particles to be heated. In this instance the pretreatment bed will serve as both a dryer for the coal and a means for removing oxygen. This arrangement will provide a low-cost source of heat with no need for heat transfer surfaces, and will heat the particles to the design bed temperature in only a few seconds. It has been demonstrated in cold flow tests that complex-mode vibration-fluidized beds can be operated to give particle motions and flow patterns that provide the desired characteristics of rapid mixing rates with relatively narrow spreads in particle transit times.

The various systems that might be employed for coal pyrolysis processes differ so widely that the particular design of vessel for the pretreatment process could take many different forms, and the same is true of the means chosen for accomplishing the heating. However, the purpose of the operation would be the same, namely; removing adsorbed and loosely bonded oxygen from the coal by heating the coal to a temperature in the 200° C. range while maintaining a low partial pressure of oxygen in the particle bed by evacuation or with a sweep gas having a low oxygen content.

While the invention has been described with reference to specific embodiments, modifications and variations of the invention may be constructed without departing from the scope of the invention, which is defined in the following claims.

We claim:

1. A coal pyrolysis pretreatment apparatus comprising a pretreatment vessel for holding a bed of coal particles, a preheater for heating the bed of coal particles to a temperature below the coal pyrolysis temperature range, an enclosure around the vessel for preventing air from contacting the bed of coal particles, an oxygen remover for removing the oxygen released from the heated coal particles and transporting it away from the enclosure so that the partial pressure of oxygen in the pretreatment region is kept low, and a flue gas source connected to a gas input for supplying low oxygen concentration flue gas as an oxygen removal sweep gas to the bed of coal.

2. The apparatus of claim 1, further comprising a vibrating machine connected to the vessel for vibrating the vessel and providing rapid mixing and heating of coal particles entering the bed from the input to provide uniform removal of oxygen from the coal particles.

3. The apparatus of claim 1, further comprising an inlet for feeding coal particles to the vessel and an outlet for removing particles from the vessel.

4. The apparatus of claim 1, further comprising a pyrolysis retort near the vessel and transfer passages for transferring heated coal particles from the pretreatment vessel to the pyrolysis retort while preventing entry of air.

5. The apparatus of claim 1, wherein the pretreatment vessel further serves as a dryer for removing moisture from the coal.

6. The apparatus of claim 1, further comprising a gas outlet connected to the enclosure for removing the sweep gas before the oxygen extracted from the coal particles builds up in the sweep gas and inhibits the deoxidation process.

7. The apparatus of claim 1, further comprising a source of carbon monoxide to the bed of coal particles and removing oxygen from the coal particles with the carbon monoxide.

8. A coal pyrolysis pretreatment apparatus comprising a pretreatment vessel for holding a bed of coal particles, a preheater for heating the bed of coal particles to a temperature below the coal pyrolysis temperature range, an enclosure around the vessel for preventing air from contacting the bed of coal particles, an oxygen remover for removing the oxygen released from the heated coal particles and transporting it away from the enclosure so that the partial pressure of oxygen in the pretreatment region is kept low, further comprising a collector for collecting non-condensable combustible gases from coal pyrolysis, and a burner for partially burning the collected non-condensable combustible gases and supplying hot, partially combusted non-condensable gases from the burner to the bed of coal particles to serve as a sweep gas for heating and removing oxygen from the bed of coal particles.

9. A coal pyrolysis pretreatment apparatus comprising a pretreatment vessel for holding a bed of coal particles, a preheater for heating the bed of coal particles to a temperature below the coal pyrolysis temperature range, an enclosure around the vessel for preventing air from contacting the bed of coal particles, an oxygen remover for removing the oxygen released from the heated coal particles and transporting it away from the enclosure so that the partial pressure of oxygen in the pretreatment region is kept low, wherein the preheater comprises a furnace holding ceramic balls of a size larger than coal particles in the bed, and provisions for circulating the ceramic balls from the furnace to the bed of coal particles for heating the coal particles in the pretreatment vessel and recycling the balls through the furnace for reheating.

10. A coal pyrolysis pretreatment process comprising heating the bed of coal particles to a temperature below the coal pyrolysis temperature range, preventing air from contacting the bed of coal particles, and removing oxygen released from the heated coal particles from the enclosure before subjecting the coal to pyrolysis, supplying low oxygen flue gas as oxygen removal gas to the bed of coal.

11. The process of claim 10, further comprising vibrating the vessel and providing rapid mixing and heating of the coal particles entering the bed from an input and uniformly removing oxygen from coal particles.

12. The process of claim 10, further comprising inputting coal particles to a pretreatment vessel and removing particles from the vessel.

13. The process of claim 10, further comprising transferring heated coal particles from the vessel to a pyrolysis retort near the vessel while preventing entry of air.

14. The process of claim 10, further comprising removing moisture from the coal.

15. The process of claim 10, further comprising contacting the coal particles in the bed with the oxygen removal gas, and removing the oxygen removal gas with the oxygen removed from the coal particles.

16. The process of claim 10, further comprising supplying carbon monoxide to the bed of coal particles and removing oxygen from the coal particles with the carbon monoxide.

17. The process of coal pyrolysis pretreatment of claim 10, further comprising providing a pretreatment vessel for holding the bed of coal particles, heating the bed of coal particles to a temperature below the coal pyrolysis temperature range in a preheater, preventing air from contacting the bed of coal particles in an enclosure around the vessel, and transporting the oxygen released from the heated coal particles away from the enclosure for keeping the partial pressure of oxygen in the pretreatment region low.

18. The coal pyrolysis pretreatment process of claim 10, further comprising transferring the pretreated coal to a pyrolysis retort in the absence of air.

19. A coal pyrolysis pretreatment process comprising heating the bed of coal particles to a temperature below the coal pyrolysis temperature range, preventing air from contacting the bed of coal particles, and removing oxygen released from the heated coal particles from the enclosure before subjecting the coal to pyrolysis, collecting non-condensable combustible gases from coal pyrolysis, and burning the collected non-condensable combustible gases for heating the bed of coal, and supplying partially combusted collected non-condensable gases from the burner to the bed of coal particles for removing oxygen from the bed of coal particles.

20. A coal pyrolysis pretreatment process comprising heating the bed of coal particles to a temperature below the coal pyrolysis temperature range, preventing air from contacting the bed of coal particles, and removing oxygen released from the heated coal particles from the enclosure before subjecting the coal to pyrolysis, wherein the heating comprises heating in a furnace ceramic balls of a size larger than coal particles in the bed, and circulating the heated ceramic balls from the furnace to the bed of coal particles for heating the coal particles in the vessel and recycling the balls through the furnace.

21. The process of claim 20, further comprising circulating some of the ceramic balls to the vessel for pretreating the coal by preheating the coal and removing oxygen, flowing coal from the pretreatment vessel to a pyrolysis retort and circulating some of the ceramic balls to the pyrolysis retort for pyrolysis of the coal.

* * * * *